United States Patent [19]

Revelli, Jr. et al.

[11] Patent Number: 5,347,377
[45] Date of Patent: Sep. 13, 1994

[54] PLANAR WAVEGUIDE LIQUID CRYSTAL VARIABLE RETARDER

[75] Inventors: Joseph F. Revelli, Jr., Rochester; Eric T. Prince, Fairport; Steven C. Switalski; Hsue-Yang Liu, both of Rochester, all of N.Y.

[73] Assignee: Eastman Kodak Company, Rochester, N.Y.

[21] Appl. No.: 899,961

[22] Filed: Jun. 17, 1992

[51] Int. Cl.$^5$ .................. G02F 1/1335; G02F 1/137; G02F 1/01

[52] U.S. Cl. ........................... 359/42; 359/93; 359/94; 359/240; 356/346; 356/351; 250/227.17; 385/30; 385/130; 385/14

[58] Field of Search ............... 356/346, 349, 351, 365, 356/368; 359/42, 91, 93, 94, 97, 98; 385/30, 130, 129, 132, 141, 14; 250/227.12, 227.18, 227.14, 227.28, 227.21, 227.19, 225

[56] References Cited

U.S. PATENT DOCUMENTS

| | | | |
|---|---|---|---|
| 3,963,310 | 6/1976 | Giallorenzi et al. | 359/102 |
| 4,309,110 | 1/1982 | Tumerman | 356/365 |
| 4,413,908 | 11/1983 | Abrams et al. | 356/346 |
| 4,595,292 | 6/1986 | Amodeo et al. | 356/346 |
| 4,721,352 | 1/1988 | Sorin et al. | 359/42 X |
| 4,722,583 | 2/1988 | Stewart | 385/40 X |
| 4,725,141 | 2/1988 | Georgiou et al. | 356/345 |
| 4,779,959 | 10/1988 | Saunders | 350/346 |
| 4,795,233 | 1/1989 | Chang | 385/30 X |
| 4,848,877 | 7/1989 | Miller | 359/91 X |
| 4,889,407 | 12/1989 | Markle et al. | 350/96.29 |
| 4,909,626 | 3/1990 | Purvis et al. | 356/332 |
| 4,928,007 | 5/1990 | Furstenau et al. | 341/137 |
| 4,936,645 | 6/1990 | Yoon et al. | 385/2 |
| 4,969,742 | 11/1990 | Falk et al. | 356/346 |
| 5,007,695 | 4/1991 | Chang | 385/3 |
| 5,007,696 | 4/1991 | Thackara et al. | 385/2 |
| 5,059,026 | 10/1991 | Zoechbauer | 359/352 |
| 5,120,131 | 6/1992 | Lukosz | 356/351 |
| 5,157,458 | 10/1992 | Wagner et al. | 356/351 |

FOREIGN PATENT DOCUMENTS

0144513 6/1990 Japan.

OTHER PUBLICATIONS

Okamura, Y. et al., "Low-Voltage Driving in Nematic Liquid Crystal Overlayered Waveguide", *Journal of Lightwave Technology*, vol. LT-4, No. 3, (Mar. 1986), pp. 360-363.

Okamura, Y. et al., "Electrooptic Leaky Anisotrolic Waveguides Using Nematic Liquid Crystal Overlayers", *Journal of Lightwave Technology*, vol. LT-2, No. 3, (Jun. 1984), pp. 292-295.

Green, M. et al., "Flat-Panel Liquid-Crystal Waveguide Display", *Proceeding of the Society for Information Display*, vol. 26, No. 2, (1985), pp. 163-165.

(List continued on next page.)

*Primary Examiner*—William L. Sikes
*Assistant Examiner*—Kenneth Parker
*Attorney, Agent, or Firm*—Clyde E. Bailey

[57] ABSTRACT

A waveguide optical device having a guide member for propagation of light in a longitudinal direction. The guide member has upper and lower boundaries. A mass of birefringent material is disposed proximal to the guide member. The birefringent material has molecular dipoles subject to alignment by an imposed electrical field. The birefringent mass is overlapped by the optical field of the propagated light. An upper electrode is disposed in spaced relation to the birefringent mass. A lower electrode is disposed in spaced relation to the guide member. The electrodes have the capability of imposing an alternating current voltage across the birefringent mass to rotate the molecular dipoles of the birefringent mass in a plane defined by the normal to the guide member and the propagation vector of the light. The boundaries and the electrodes define an upper isolation zone between the upper electrode and the upper boundary, a guide path between the boundaries, and a lower isolation zone between the lower boundary and the lower electrode. The guide path has an effective index of refraction greater than the effective indexes of refraction of the isolation zones.

24 Claims, 5 Drawing Sheets

OTHER PUBLICATIONS

Terui, H. et al., "8×8 Optical Waveguide Switch Using Liquid Crystal", *SPIE vol. 517-Integrated Optical Circuit Engineering*, (1984), pp. 267-274.

Verly, P. G., "Low Loss Liquid-Crystal-Clad Waveguide Switch with a Large Angular Separation of the Optical Beam", *Canadian Journal of Physics*, vol. 65, (1987), pp. 476-483.

Hu, C. et al., "Optical Deflection in Thin-Film Nematic-Liquid-Crystal Waveguides", *IEEE Journal of Quantum Electronics*, vol. QE-10, No. 2, (Feb. 1974), pp. 218-222.

C. Hu, et. al., "Field-Realigned Nematic Liquid Crystal Optical Waveguides", *IEEE Journal of Quantum Electronics*, vol. QE-10, No. 7, (Jul. 1974), pp. 556-562.

Okamoto, T. et. al., "A Photodiode Array Fourier Transform Spectrometer Based on a Birefringent Interferometer", *Applied Spectroscopy*, vol. 40, No. 5, (1986), pp. 692-695.

Itoh, K. et. al., "Liquid-crystal imaging in Fourier-spectrometer array," *Optics Letters*, vol. 15, No. 11, (Jun. 1, 1990), pp. 652-654.

Okamoto, T. et. al., "Fourier transform spectrometer with a self-scanning photodiode array", *Applied Optics*, vol. 23, No. 2, (Jan. 15, 1984), pp. 269-273.

Matsui, S. et al., "An FT, visible microscope, photodiode array spectrometer", *American Laboratory*, (Aug. 1989), pp. 30-35.

Stroke, G. W., et. al., "Fourier-transform spectroscopy using holographic imaging without computing and with stationary interferometers", *Physics Letters*, vol. 16, No. 13, (Jun. 1, 1965), pp. 272-274.

Suni, P. J. et. al., "Lasing Characteristics of Ytterbium, Thulium and Other Rare-Earth Doped Silica based Fibers", *Fiber Laser Sources and Amplifiers*, SPIE, vol. 1171, (1989), pp. 244-260.

Reekie, L. et. al., "Tunable Single-Mode Fiber Lasers", *Journal of Lightwave Technology*, vol. LT-4, No. 7, (Jul. 1986), pp. 956-960.

Kitagawa, T. et. al., "Guided-Wave Laser based on Erbium-Doped Silica Planar Lightwave Circuit", *Electronics Letters*, vol. 27, No. 4, (Feb. 14, 1991), pp. 334-335.

PLANAR WAVEGUIDE LIQUID CRYSTAL VARIABLE RETARDER

BACKGROUND OF THE INVENTION

The present invention pertains to light modification by birefringent materials, waveguides, interferometry and spectrometry and more particularly pertains to waveguide liquid crystal optical devices.

U.S. Pat. Nos. 4,928,007 and 4,969,742 teach integrated optical chips which have interferometers having optical waveguides and a birefringent crystal of a material such as lithium niobate. The optical path length through the crystal is varied by imposing a electrical field across the crystal. The crystals in these devices present a major shortcoming in that the crystals have small electrooptic coefficients and thus require the imposition of large voltages and produce very small changes in optical path.

Liquid crystals have been utilized in optical waveguide devices to provide a variety of results. Optical modulators are described by Okamura, Y. et. al. in "Low-Voltage Driving in Nematic Liquid Crystal Overlayered Waveguide", *Journal of Lightwave Technology*, Vol. LT-4, No. 3, (March 1986), pp 360–363; Okamura, Y. et. al. in "Electrooptic Leaky Anisotropic Waveguides Using Nematic Liquid Crystal Overlayers", *Journal of Lightwave Technology*, Vol. LT-2, No. 3, (June 1984) pp 292–295; and Green M. et. al. in "Flat-Panel Liquid-Crystal Waveguide Display", *Proceedings of the Society for Information Display*, Vol. 26, No. 2, (1985) pp 163–165. These papers teach devices which use a liquid crystal cell to selectively make a waveguide "leaky". The indexes of a waveguide and liquid crystal material on or near the waveguide are selected such that a potential, applied by adjoining electrodes, causes propagated light to be coupled out of the waveguide.

Optical switches described by Terui, H. et. al. in "8×8 Optical Waveguide Switch Using Liquid Crystal", *SPIE, Vol. 517-Integrated Optical Circuit Engineering*, (1984), pp 267–274 and Verly, P.G., "Low Loss Liquid-Crystal-Clad Waveguide Switch with a Large Angular Separation of the Optical Beam", *Canadian Journal of Physics*, Vol. 65, (1987), pp 476–483 are not "leaky", however, the exit site of a propagated beam is switched by using liquid crystal material to cause reflection or transmittance of light at a boundary. A waveguide beam deflector, described by Hu, C. et. al. in "Optical Deflection in Thin-Film Nematic-Liquid-Crystal Waveguides", *IEEE Journal of Quantum Electronics*, Vol. QE-10, No. 2, (February 1974), pp 218–222, scatters propagated light in a thin film waveguide into multiple modes and uses an imposed voltage to variably couple the light out of the waveguide. It has been shown by C. Hu and J. R. Whinnery in "Field-Realigned Nematic Liquid Crystal Optical Waveguides", *IEEE Journal of Quantum Electronics*, Vol. QE-10, No. 7, July 1974, PP. 556–562, that optical waveguides formed with LC layers in which the director rotates in the plane defined by their guided mode propagation vector and the normal to the plane of the guide member exhibit stationary transverse electric (TE) and transverse magnetic (TM) eigenmodes. The TE eigenmodes are characterized by electric field vectors lying in the plane of the guide member and by effective indexes of refraction which are independent of the applied voltage. TM eigenmodes are characterized by magnetic field vectors lying in the plane of the guide member and effective indexes of refraction which depend upon the applied voltage.

U.S. Pat. Nos. 4,779,959 to Saunders, 4,595,292 to Amodeo et. al., and 4,909,626 to Purvis et. al. each teach optical devices in which an electrical field imposed on a liquid crystal cell changes an optical path length. Each of these patents have the shortcoming that the liquid crystal dimension is very small and a delay induced is limited to a few waves. (Wave retardation or delay is equal to the optical path difference divided by the wavelength.)

U.S. Pat. No. 4,725,141 to Georgiou et. al. teaches a Mach Zehnder interferometer in which beam splitters and mirrors are replaced by continuous optical fibers. The optical path length of one arm is changed by heating or surrounding the optical fiber with liquid crystal to change the effective index of refraction. The use of electrodes is not disclosed.

SUMMARY OF THE INVENTION

It is an object of the invention to provide an improved waveguide liquid crystal optical device. In the waveguide liquid crystal optical device of the invention, propagated light is guided along the longitudinal axis of an elongate mass of liquid crystal and a voltage imposed on the liquid crystal varies the optical pathlength, without coupling the propagated light out of the waveguide. In the broader aspects of the invention there is provided a waveguide optical device having a guide member for propagation of light in a longitudinal direction. The guide member has upper and lower boundaries. A mass of birefringent material is disposed proximal to the guide member. The birefringent material has molecular dipoles subject to alignment by an imposed electrical field. The birefringent mass is overlapped by the optical field of the propagated light. An upper electrode is disposed in spaced relation to the birefringent mass. A lower electrode is disposed in spaced relation to the guide member. The electrodes have the capability of imposing an alternating current voltage across the birefringent mass to rotate the molecular dipoles of the birefringent mass in a plane defined by the normal to the guide member and the propagation vector of the light. The boundaries and the electrodes define an upper isolation zone between the upper electrode and the upper boundary, a guide path between the boundaries, and a lower isolation zone between the lower boundary and the lower electrode. The guide path has an effective index of refraction greater than the effective indexes of refraction of the isolation zones.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawings wherein.

DESCRIPTION OF A SPECIFIC EMBODIMENT

Figure 1:
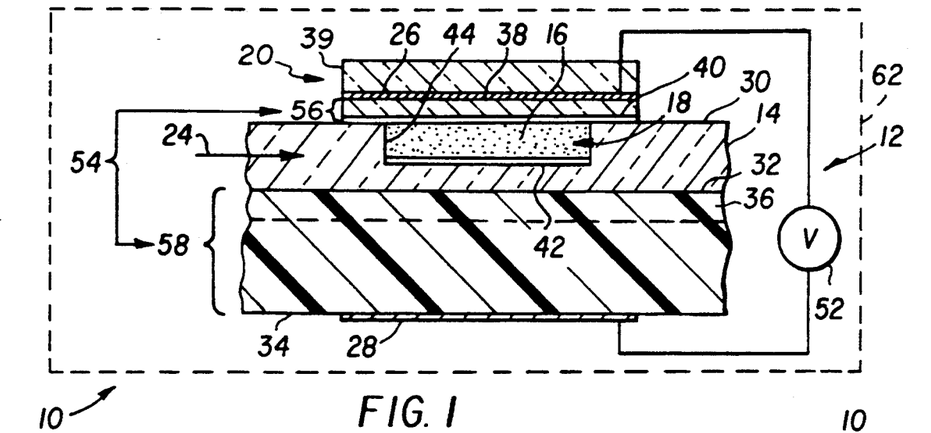
FIG. 1 is a diagrammatical cross-section of an embodiment of the liquid crystal optical device of the invention.
Figure 2:
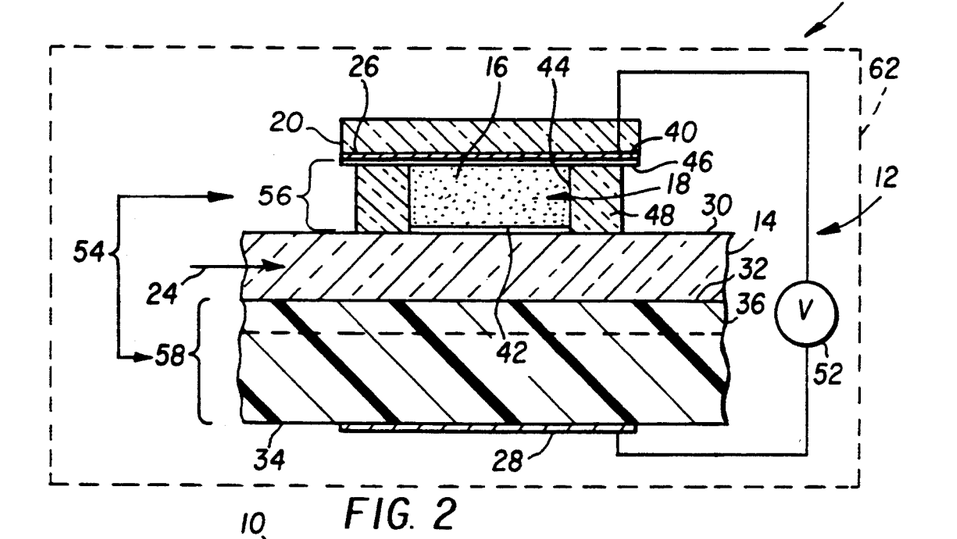
FIG. 2 is a diagrammatical cross-section of an alternative embodiment of the liquid crystal optical device of the invention.

Referring initially to features best shown in FIGS. 1 and 2, the waveguide liquid crystal phase shifter or waveguide optical device 10 of the invention has an optical waveguide 12, which has the capability of propagating a transverse magnetic guided mode. Waveguide 12, in a preferred embodiment of the invention, is planar and includes a guide member 14. All figures are diagrammatical and some dimensions are exaggerated for clarity. Integral with guide member 14 is an elongate mass 16 of birefringent material, which has molecular dipoles, that is, dipoles on a molecular scale, that are subject to alignment by an imposed electrical field. In a particular embodiment of the invention, birefringent mass 16 is nematic liquid crystal. Birefringent mass or liquid crystal mass 16 fills a chamber 18 interposed between and defined by guide member 14 and a superimposed cover 20. Birefringent mass 16 defines a longitudinal axis that is aligned with the direction of light propagation in waveguide, indicated diagrammatically by arrow 24. LC optical device 10 also includes a voltage member, which is a pair of parallel electrodes 26,28 positioned to apply a voltage across birefringent mass 16. Guide member 14, birefringent mass 16, cover 20, chamber 18, and electrodes 26,28 are all preferably substantially planar, that is, respective length and width dimensions are orders of magnitude larger than the corresponding thickness or depth dimension.

Guide member 14 is a film of high refractive index material through which light, indicated diagrammatically by arrow 24, is propagated in a longitudinal direction. Guide member 14 has parallel upper and lower boundaries 30,32. The length and width of guide member 14, in directions perpendicular to the thickness, that is, the distance separating boundaries 30,32, are a matter of convenience for a particular use, although it is desirable that the width dimension be more than 100 times the wavelength of the propagated light. A suitable thickness for guide member 14 is between about 0.2 micrometers and about 5 micrometers. Examples of suitable materials for guide member 14 are $SiO_xN_y$, Corning 7059 glass, BK-7 glass, silica-titania sol gel, $Ta_2O_5$, $As_2S_3$, and ZnO. A practical advantage of using $SiO_xN_y$ is that this material is a common passivation layer material used throughout the semiconductor industry. $SiO_xN_y$ has an index of refraction that can be varied from 1.46, for $SiO_2$, to over 2.0, for $Si_3N_4$, by varying the values of x and y; x can be varied between 0 and 2 and y can be varied between 0 and 4/3. A convenient guide member 14 is a film of $SiO_xN_y$ 0.4 to 1.0 micrometers in thickness. LC optical device 10 varies the optical path length for guided transverse magnetic modes. Material and thickness of guide member 14 can be selected such that waveguide 12 exhibits a single transverse magnetic mode over a particular wavelength bandwidth.

A base 34 underlies guide member 14. Base 34 can be any of a variety of materials and configurations. Base 34 can provide physical support and is capable of withstanding both the manufacture and use of LC device 10 without causing an unacceptable degradation of performance. Base 34 includes a base buffer layer 36, which optically buffers guide member 14 from lower electrode 28 and other adjacent metallic or high refractive index dielectric structures. Base 34 can be uniform or, alternatively, base buffer layer 36 can be a discrete layer of a different material than the remainder of base 34. Base 34 can be shared with other components. For example, a convenient base 34 is a silicon chip, which includes a discrete low index $SiO_2$ base buffer layer 36, one to three micrometers thick, to optically isolate the guided wave from the high index silicon. This base 34 can optionally include integrated electronic components, such as detectors, amplifiers, drivers, thermal devices for temperature stabilization, and the like (not shown), formed in or on the silicon.

Cover 20 of LC optical device 10 overlies at least a portion of guide member 14. Cover 20 has a thickness, which is much less than the length and width dimensions of cover 20, however, specific dimensions for cover 20 are generally a matter of convenience. If desired, cover 20 can have the same length and width as guide member 14. Like base 34, cover 20 can provide physical support, although in particular embodiments of the invention, base 34 predominates in providing physical support and cover 20 can be relatively thin in comparison to base 34. As discussed below, cover 20 can include a cover buffer layer 38 to provide optical buffering of guide member 14 from upper electrode 26 or other adjacent metallic or high refractive index dielectric structures. In the embodiment of the invention of FIG. 1, cover buffer layer 38 and an upper support layer 39 are below and above upper electrode 26, respectively and cover buffer layer 38 has a thickness of from 2 to 3 microns. Cover buffer layer 38 can include an extraneous portion (not designated in the figures) proving an additional thickness beyond that necessary for buffering. It is preferred, however, that lower layer 38 have the minimum thickness required to provide necessary optical buffering. Lower layer 38 can be deleted if unneeded for optical buffering, as shown in FIG. 2. Glass or silicon or other equivalent material can be used for cover 20 and cover buffer layer 38 can consist of the same materials as base buffer layer 36. Cover 20 can be affixed to guide member 14 by adhesive or the like (not shown) placed, for example, at the outside edges of cover 20.

Chamber 18 and birefringent mass 16, with which chamber 18 is filled, are positioned so as to be overlapped by the optical field of light propagated through guide member 14, that is, chamber 18 is wholly or partially within guide member 14 or adjoins guide member 14 at a separation from guide member 14 that is less than the outward extension of the evanescent field of light propagated through waveguide 12. FIG. 1 shows a "non-evanescent field" embodiment of optical device 10, in which chamber 18 is wholly within guide member 14. FIG. 2 shows an "evanescent field" embodiment of optical device 10, in which chamber 18 adjoins guide member 14, at a separation less than the outward extension of evanescent field.

Chamber 18 is bounded vertically by alignment layers or aligners 40,42, discussed in detail below, and horizontally by walls 44. The width or transverse dimension of chamber 18 is preferably greater than the width of the guided beam. (Directional terms are used herein on a relative basis in which arrow 24 defines both a "longitudinal" and a "horizontal" direction. The LC optical device 10 of the invention may be used in any absolute orientation.) Alignment layers 40,42 are parallel and have substantially the same or larger length and width dimensions than chamber 18.

Referring now to FIG. 1, in particular embodiments of the invention, chamber 18 is an excavation or trench in guide member 14 and has substantially the shape of a rectangular plate. Techniques for forming such a trench in a waveguide 12, by deletion procedures, for example, by ion milling, or by addition procedures, for example, by masking an area for a trench and depositing waveguide material in unmasked areas, are well known to those skilled in the art. The depth of chamber 18 is constant and less than or equal to the full thickness of guide member 14. The width and length of chamber 18 are defined by walls 44 formed by guide member 14. The length of chamber 18 is uniform and parallel to the direction of light propagation. First or cover alignment layer or cover aligner 40 extends between walls 44 of chamber 18 and beyond walls 44 has a superfluous portion 46 extending to the full length and width of cover 20. Second or guide alignment layer or guide aligner 42 occupies the bottom of the trench in waveguide 12. Holes (not shown) are provided in cover 20 or are provided by gaps in adhesive holding cover 20 to guide member 14, to permit chamber 18 to be filled after cover 20 has been placed in position. Holes are located so as to not obscure the optical path; for example, chamber can be wider than the optical path and holes can be laterally displaced from optical path. After chamber is filled, holes can be plugged. An example of a chamber 18 of this embodiment of the invention is a trench having a length of about 10 millimeters, a width of between about 1 and about 10 millimeters and a uniform depth between about 0.2 and about 0.7 micrometers, ion milled in a guide member 14 of $SiO_xN_y$ having a thickness of about 0.4 to about 1.0 micrometers and a width of about 0.2 to 20 millimeters.

Referring now to FIG. 2, in another embodiment of the invention, chamber 18 has roughly the same shape as the chamber 18 of the embodiment of FIG. 1, but is external to guide member 14. This "evanescent field type" embodiment of the invention is comparable in structure to that of FIG. 1, however, chamber 18 is bounded laterally and at each end by walls 44 defined by a spacer 48, which is made of a material that can provide physical support and is inert to other materials of LC device 10 and is transparent to the light propagated in waveguide 12. Chamber 18 is filled by means of holes (not shown), which can be located as discussed above in relation to the embodiment of FIG. 1, or can be provided in spacer 48. Aligners 40,42 can each be limited to the slot or chamber 18 defined by spacer 48 or can extend beyond slot 18 as a matter of manufacturing convenience. An example of a chamber 18 of this embodiment of the invention is a slot 18 about 10 to about 50 millimeters long, about 1 to about 10 millimeters wide and about 1 to about 50 micrometers deep, in a mylar spacer 48 having arbitrarily larger length and width dimensions and a thickness equal to the depth of slot 18.

Referring now to the embodiments of both FIGS. 1 and 2, birefringent mass 16 is nematic liquid crystal material having a positive or negative anisotropy. Liquid crystal mixtures suitable for the invention include one or more compounds selected from phenylcyclohexylbenzoates, cyclo-cyclohexylbenzoates, phenyl-cyclohexanecarboxylates, phenylpyrimidines, bicyclohexylcarbonitriles, tercyclohexylcarbonitriles, biphenylcyclohexanes; and their derivatives. These types of liquid crystal mixtures can be obtained, for example, from E. Merck of Darmstadt, Germany. Other suitable liquid crystal materials are well known to those skilled in the art.

Aligners 40,42 orient the molecules of birefringent or LC mass 16 in chamber 18, in the absence of an applied electrical field, due to the interaction of LC molecules and the surface of aligners 40,42. Aligners 40,42 can each be a modified surface layer produced by a mechanical treatment, such as rubbing. It is preferable, however, that aligners 40,42 each be a layer of a material, which can provide alignment without further mechanical treatment. It is believed that such layers provide less light scattering losses than aligners 40,42 produced by mechanical treatment. An example of a suitable aligner is a layer of $SiO_x$ having a thickness of about 50 angstroms applied by thermal evaporation of SiO with the surface of guide member 14 or cover 20 inclined at a slight angle of about 5 degrees to the flux.

First and second aligners 40,42 are applied so as to cause LC molecules to align in a plane 62 that contains the direction of propagation of the light in waveguide 12 and the normal to the plane of the waveguide 12. The director of liquid crystal mass 16 is substantially parallel or substantially perpendicular to the direction of light propagation, that is, the longitudinal dimension of aligners 40,42. In a particular embodiment of the invention, the liquid crystal material selected has negative anisotrophy and the alignment of the director of liquid crystal mass 16 is homeotropic, that is the director lies substantially perpendicular to the longitudinal dimension of aligners 40,42 when no electrical field is imposed. In another embodiment of the invention, the liquid crystal material has positive anisotrophy, then the alignment is homogeneous and the director is substantially parallel to the longitudinal dimension of aligners 40,42 when no electrical field is imposed. It is desirable that the depth of chamber 18 be shallow in order to minimize the separation of each LC molecule from aligners 40,42, since minimizing separation also minimizes fluctuations of LC molecules out of alignment and resulting light scattering. In evanescent field embodiments like FIG. 2, this consideration and that of ease of construction are the primary ones in determining the depth of chamber 18. In non-evanescent field embodiments of the invention like FIG. 1, a competing consideration is that, when chamber 18 is interposed in guide member 14, the greater the depth of chamber 18, the greater the possible retardation of the light propagated, up to the limit that the entire field including the evanescent portion overlaps birefringent mass 16.

Electrodes 26,28 are desirably parallel to aligners 40,42 and at least as long and wide as chamber 18. Electrodes 26,28 are optically buffered from guide member 14. In the embodiment of the invention of FIG. 1, lower electrode 28 is deposited directly upon the outer surface of base 34 and upper electrode 26 is disposed between the layers of cover 20. In the embodiment of FIG. 2, upper electrode 26 is instead disposed directly over upper aligner 42. The thickness of electrodes 26,28 can be varied as desired. Electrodes 26,28 can each be, for example, a 100 to 2000 angstroms thick layer of a conductive material, such as, a deposited layer of indium tin oxide or a metal such as gold or aluminum. A convenient indium tin oxide electrode layer is 100 to 1000 angstroms thick. Alternatively, the thickness of one or both electrodes 26,28 can be much greater. For example, a heavily p-doped silicon chip can be used as lower electrode 28, in which case, lower electrode 28 provides physical support for LC optical device 10 and base 34 can be limited to a base buffer layer 36 having a thickness of several micrometers or less. Buffer layer 36 can, for example, be a layer of $SiO_2$ thermally grown on the silicon chip. Such a p-doped silicon chip, or the like, can also be used for upper electrode 26, in which case, cover 20 can be similarly reduced in thickness and cover buffer layer 38 can be a thermally grown $SiO_2$ layer, having a thickness of 10 microns or less. Electrodes 26,28 are connected to a source 52 of alternating current having a frequency between about 10 Hz and about 100 kHz, which can impose an electrical potential between electrodes 26,28. A convenient voltage is less than 100 volts, however, the maximum voltage is only limited by dielectric breakdown. Source 52 can be controlled to permit the imposed voltage to be varied.

Several portions of LC optical device 10 together constitute an optical isolator 54. Optical isolator 54 includes: cover buffer layer 38 (if present), base buffer layer 36, and, in evanescent field embodiments of the invention like FIG. 2, the LC material 16. Aligners 40,42 are also a part of isolator 54, however, aligners 40,42 are preferably very thin, on the order of fifty angstroms thick, and thus contribute little to optical isolation and generally need not be considered. Optical isolator 54 is divided into an upper isolation zone 56 between upper electrode 26 and upper boundary 30 of guide member 14 and a lower isolation zone 58 between lower boundary 32 of guide member 14 and lower electrode 28. Between upper and lower isolation zones 56,58 is a guide path for the propagated light, which extends through guide member 14, and in non-evanescent field embodiments like FIG. 1 also through liquid crystal mass 16.

Guide member 14, buffer layers 36,38, and in evanescent field type embodiments like FIG. 2, LC material are selected so that, for a particular wavelength bandwidth, the effective index along guide path, that is the index along the guided mode propagation vector, is greater than the indexes of isolator 54. This ensures that the guided mode will not be "leaky", that is, the propagation vector of the guided light remains non-evanescent; or stated another way, the guided light remains confined within waveguide 12 regardless of the voltage applied across chamber 18 by electrodes 26,28. In non-evanescent field embodiments like FIG. 1, the effective index along guide path through guide member 14 and liquid crystal mass 16 is greater than the indexes of cover buffer layer 38 and base buffer layer 36. In evanescent field embodiments like FIG. 2, the effective index of guide member 14 is greater than the indexes of cover buffer layer 38, base buffer layer 36 and both ordinary and extraordinary indexes of the LC material.

The LC optical device 10 of the invention is used to generate a delay or optical path difference (OPD) in a transverse magnetic guided mode of propagated light. Electrodes 26,28 are connected to electrical source 52 and a voltage is applied across chamber 18 causing the director of liquid crystal mass 16 to rotate in the plane 62 containing the normal to waveguide 12 and the propagation vector of the guided light, since nematic liquid crystal molecules orient relative to the rms value of an applied AC field. This changes the effective refractive index ($n_{eff}$) of the liquid crystal mass 16, for the guided mode. Because the rotation of the director of liquid crystal mass 16 is confined to plane 62, the polarization state of light guided in LC waveguide 12 remains transverse magnetic. As a result, the phase of the guided light is shifted as it propagates through LC optical device 10, but the polarization of guided light does not change. This changes the effective optical path length. The optical path length in liquid crystal mass 16 is, by definition, the product of the effective refractive index and the liquid crystal dimension along the direction of light propagation. The maximal electrically variable change in optical path length is, by equivalent definition, the product of the maximum change in electrically variable refractive index that can be induced by varying the electrical field, without dielectric breakdown or the like, multiplied by the dimension of the component along the direction of light propagation.

Appropriate guide member 14, liquid crystal mass 16 and isolator 54 characteristics can be selected empirically based upon the characteristics of known wave guides and liquid crystal materials. For example, for the wavelength bandwidth of 500 nanometers to 2000 nanometers, a convenient liquid crystal material is a product marketed as ZLI-1289 by E. Merck of Darmstadt, Germany, which has an $n_e$ of 1.707 and an $n_o$ of 1.517 for light at a wavelength of 0.6328 nanometers. If ZLI-1289 is used as LC material $SiO_xN_y$ can be used for guide member 14, in which $x=0.75-1.25$ and $y=0.50-0.75$ for the embodiment of FIG. 1, and in which $x=0.50-1.0$ and $y=0.75-1.25$ for the embodiment of FIG. 2. Buffer layers 36,38 for both embodiments can be $SiO_xN_y$, in which $x=1.5-2.0$ and $y=0-0.5$.

Alternatively, appropriate guide member 14, liquid crystal mass 16 and isolator 54 characteristics may be determined analytically. In general $n_{eff}$, the effective index of the guided mode, is a function of the wavelength of light and the thicknesses and indexes of refraction of guide member 14, liquid crystal mass 16, and isolator 54; however, $n_{eff}$ cannot be expressed explicitly in a closed analytic form. A value for $n_{eff}$ can be determined by solving for the eigenvalues of the boundary value problem associated with the multilayer stack formed by guide member 14, liquid crystal mass 16, and the layers of isolator 54. Transverse magnetic eigenmodes are those of interest, since TM modes have effective indexes of refraction which depend upon the applied voltage. The differential equation associated with each layer "m" of the multilayer stack is:

$$g_{33,m} f_m'' + (g_{33,m}' + 2ik_o n_{eff} g_{13,m}) f_m' + (k_o^2 - k_o^2 n_{eff}^2 g_{11,m} + ik_o n_{eff} g_{13,m}') f_m = 0$$

where $k_o = 2\pi/\lambda_o$ and $\lambda_o$ is the wavelength of the light in vacuum. The function f(x) represents the spatial distribution of the transverse magnetic field where x is the distance along the axis perpendicular to the direction of propagation of light and parallel to plane 62 and the $x=0$ plane is taken to be the center of liquid crystal mass 16. f' and f'' are the first and second derivatives, respectively, of f with respect to x. When the subscript m corresponds to the anisotropic liquid crystal layer 16, represented by $m=LC$, the parameters $g_{11,LC}$, $g_{33,LC}$, and $g_{13,LC}$ are given by:

$$g_{11,LC} = (\sin^2\theta)/n_o^2 + (\cos^2\theta)/n_e^2$$

$$g_{33,LC} = (\cos^2\theta)/n_o^2 + (\sin^2\theta)/n_e^2$$

$$g_{13,LC} = (1/n_e^2 - 1/n_o^2)\sin\theta\cos\theta$$

where $n_e$ and $n_o$ are the extraordinary and ordinary indexes of refraction, respectively, of the liquid crystal mass and $\theta$ is the voltage-dependent local director orientation angle. $\theta(x)$ is given implicitly by the equation:

$$F[\sin^{-1}(\sin\phi/\sin\phi_0)\backslash\phi_0] = (d/2 - |x|)/\epsilon$$

where F is the elliptic integral of the first kind, $\phi$ is the angle between the director and the x axis previously defined and $\phi_o$ is the angle of the director at the center of the liquid crystal mass 16, that is, the x=0 plane, which is equidistant from the two bounding aligners 40,42. In the case of homeotropic alignment, $\theta$ is equal to $\phi$ whereas in the case of homogeneous alignment, $\theta$ is equal to the difference between 90 degrees and $\phi$. The parameter $\epsilon$ is given by:

$$\epsilon = (d/\pi)(V_c/V)$$

where d is the thickness of the liquid crystal mass 16. V and $V_c$ are the applied and critical voltages, respectively. The critical voltage is a parameter that depends upon the particular liquid crystal material chosen. For voltages less than or equal to the critical voltage, $\phi = \phi_o = \phi_B$, (where $\phi_B$ is the director angle at alignment layers 40,42) the director does not rotate.

For isotropic guide member 14 and the other remaining isotropic layers 36,38,40,42, the parameters $g_{11,m}$, $g_{33,m}$, and $g_{13,m}$ are given by $$g_{11,m} = 1/n_m^2$$

$$g_{33,m} = 1/n_m^2$$

$$g_{13,m} = 0$$

where $n_m$ is the index of refraction of the guide member 14 or other isotropic layer.

In order to complete the specification of the equations which yield $n_{eff}$ it is necessary to specify the boundary conditions. The boundary conditions in the buffer layers are that the TM field f(x) must vanish for $|x|$ approaching infinity. For other layers the boundary conditions require that both the TM field f(x) and the quantity $g_{33,m}f'(x)$ should be continuous at the boundaries between layers. These boundary conditions are equivalent to requiring that the tangential electric field and tangential magnetic fields are continuous across the boundaries between layers. Numerical solutions for $n_{eff}$ can be most conveniently obtained by use of a computer, using techniques well known to those skilled in the art.

Figure 3:
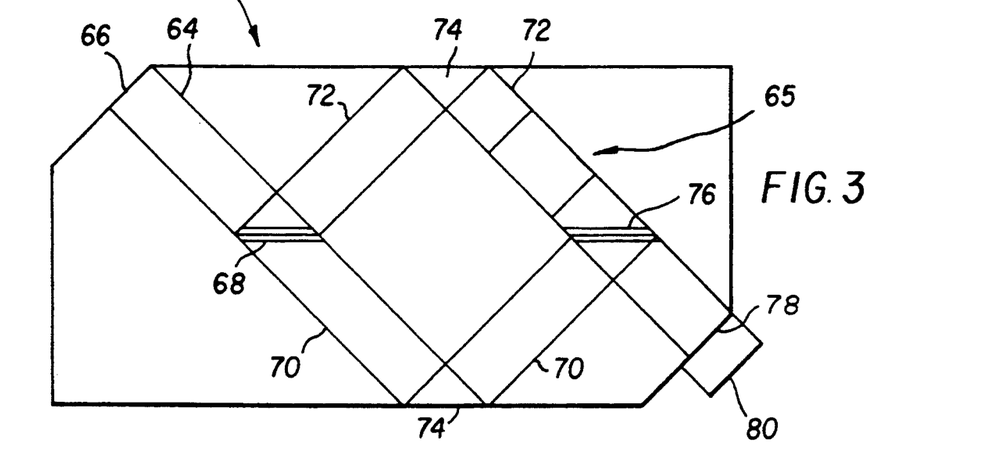
FIG. 3 is a diagrammatical top plan view of another embodiment of the liquid crystal optical device of the invention.

FIG. 3 shows an additional embodiment of LC optical device 10, which is an elaboration of the LC optical device 10 of either the embodiment of FIG. 1 or the embodiment of FIG. 2. As a matter of clarity, that portion of the LC optical device 10 of FIG. 3, which is the same as the LC optical device of FIG. 1 or 2, is designated "65" in FIG. 3. The LC optical device 10 of FIG. 3 provides an integrated optical chip, which performs as a Mach-Zehnder interferometer. Referring now to FIG. 3, waveguide 64 has an entrance 66 leading to a beam splitter 68, at which waveguide 64 is divided into a reference arm 70 and a delay arm 72. Each arm 70,72 is redirected by a reflector 74 to a beam combiner 76, which leads to an exit 78. In reference arm 70, waveguide 64 has a guide member bounded by buffer layers (not illustrated). Delay arm 72 has guide member 14, buffer layers 36,38 and liquid crystal mass 16 disposed in the manner described above for the embodiment of FIG. 1 or FIG. 2. A detector 80 adjoins exit 78.

Beam splitter 68 and beam combiner 76 are a pair of chirped gratings in which the chirps run in opposite directions. One procedure for producing these chirped gratings uses a holographic exposure taught by Heitmann, D. et. al. in "Calculation and Experimental Verification of Two-Dimensional Focusing Grating Couplers", *IEEE Journal of Quantum Electronics*, Vol. QE-17, No. 7 July 1981 pp 1257-1263 incorporated herein by reference, and Bryan, D. A. et. al. in "Improved Holography for Chirped Gratings", *Optics Letters*, Vol. 5, No. 9, Sept. 1980, pp 407-409, incorporated herein by reference. In that holographic procedure, photoresist is coated on the waveguide and exposed using a collimated beam interfered with a focused beam from a cylinder lens. After holographic exposure, image reversal techniques, such as those taught by Long, M. L. et. al. in "Image Reversal Techniques with Standard Positive Photoresist", *Advances in Resist Technology, SPIE*, Vol. 469, (1984), pp 189-193, incorporated herein by reference; would be required to delineate the two rectangular grating regions, followed by ion milling to transfer the grating pattern into the waveguide. The resist pattern would then be removed by conventional resist stripping techniques.

An alternative procedure for producing chirped gratings uses electron beam lithography. The waveguide would be coated with an e-beam resist and the chirped grating pattern would be drawn in the e-beam resist using a commercially available e-beam writing system such as Electron-Beam Microfabricator from Cambridge Instruments of Cambridge, United Kingdom. After development, the pattern is transferred into the glass by ion milling followed by removal of the e-beam resist as discussed by Hori, Y. et. al. in "Fabrication of a Focusing Grating Mirror by Electron Beam Lithography", *Applied Optics*, Vol. 29, No. 17, (Jun. 10, 1990), pp 2522-2526, incorporated herein by reference.

Reflectors 74 could be provided by chirped gratings produced in the same manner as chirped gratings or by polished endfaces. A suitable apparatus for producing polished endfaces is a Logitech Model 1PMA2 precision lapping and polishing system from Logitech, Ltd. of Glasgow, Scotland, United Kingdom.

Silicon or germanium photodiodes or other suitable photodetectors can be used as detectors 80. Silicon detectors are useful in the 0.35 to 1.1 micrometer wavelength range. Such detectors are available commercially from United Detector Technology, a division of ILC Technology, Inc., Hawthorne, Calif. Germanium detectors are useful in the 0.5 to 1.8 micrometer range. Such detectors are available commercially from EG&G Judson, a division of EG&G Princeton Applied Research, Princeton, N.J. Other photodiodes of material such as InAs, InSb and InGaAs could also be used for the 1 to 2 micrometer wavelength range. Detector 80 can be butt-coupled to exit 78.

LC optical device 10 could be further modified by internalizing detector 80 and a light source within waveguide 64 to reduce coupling losses. Light sources formed by modified sections of silica are known to those skilled in the art. For example, rare earth doped silica waveguide lasers have been reported by Suni, P.J. et. al.

in "Lasing Characteristics of Ytterbium, Thulium and Other Rare-Earth Doped Silica based Fibers", *Fiber Laser Sources and Amplifiers, SPIE*, Vol. 1171, (1989), pp 244–260; Reekie, L. et. al. in "Tunable Single-Mode Fiber Lasers", *Journal of Lightwave Technology*, Vol. LT-4, No. 7, (July 1986), pp 956–960; and Kitagawa, T. et. al. in "Guided-Wave Laser based on Erbium-Doped Silica Planar Lightwave Circuit", *Electronics Letters*, Feb. 14, 1991, Vol. 27, No. 4, pp. 334–335. Detectors and amplifiers and other electrical devices can similarly be incorporated directly in or on a silicon substrate.

The LC optical device 10 of FIG. 3 is a Mach-Zehnder interferometer, however, the LC device of the invention can also be configured to provide other types of interferometers. The use of LC device is not limited to interferometers, but extends to a variety of optical equipment; such as sensors, telecommunication devices, and optical logic devices; which require unusually large changes in phase or optical path length. The optical path difference which can be obtained using the LC device of the invention is very large and is believed to be greater than the OPD that can be obtained using any other variety of electro-optical device at the same voltage. This is true even of the evanescent field type LC optical device 10, despite the inherent inefficiency of this embodiment of LC optical device 10 in comparison to the non-evanescent field embodiment. In the Example, an evanescent type LC optical device 10, demonstrated the retardation indicated in the Table. The maximum OPD generated of 63 micrometers was greater than the OPD that could be provided by other types of electro-optical phase shifter at the same voltage. The LC optical device 10 of the Example was not single mode, however, a single TM mode LC optical device 10 could be prepared in the same manner as described in the Example, with the exception of varying the guide member thickness or index.

Use of the LC optical device 10 of the invention is below described for the embodiment of FIG. 3. Other embodiments of the LC optical device 10 of the invention are used in a comparable manner. The Mach-Zehnder interferometer LC device of FIG. 3 is used with a source of polarized light, which is coupled into the waveguide such that the transverse magnetic mode is excited. Referring now to FIGS. 1–3, after entering at entrance 66, propagated TM light is divided by beam splitter 68 into reflected and transmitted portions, which are propagated along respective arms 70,72, redirected by reflectors 74 in each arm 70,72 and recombined by beam combiners 76. Light propagated through delay arm 72 overlaps liquid crystal mass 16. Electrodes 26,28 are connected to an electrical source 52 and an AC field is applied across chamber 18. The molecules of LC material rotate in the plane 62 containing the normal to the waveguide 12 and the propagation vector of the guided light. The polarization state of the guided light remains transverse magnetic, but the phase of the guided light is shifted varying the effective path length along arm 72.

Referring now to FIGS. 1 and 2, within chamber 18 of LC device 10, light scattering due to fluctuations in the orientation of LC molecules is believed to be minimized. Fluctuations in the orientation of a LC molecule are more pronounced the farther that molecule is from the influence of the surface aligners 40,42. In the embodiment of FIG. 1, upper and lower aligners 40,42 are separated by only a few hundred nanometers; thus even LC molecules in the center of chamber 18 are believed to be effectively influenced by aligners 40,42. The close placement of aligners 40,42 also permits the close placement of electrodes 26,28 and a reduction in drive voltage. The claimed inventions are not subject to limitation by any particular theory or belief expressed herein, however, it is believed that theoretical values for change in refractive index could be approached in the practice of the invention. For example, theoretically in the embodiment of FIG. 1, in which chamber 18 is embedded within waveguide, the change in effective refractive index of the guided light would approach the difference between ordinary and extra-ordinary indexes $(n_e - n_o)$ of the LC material.

Figure 4:
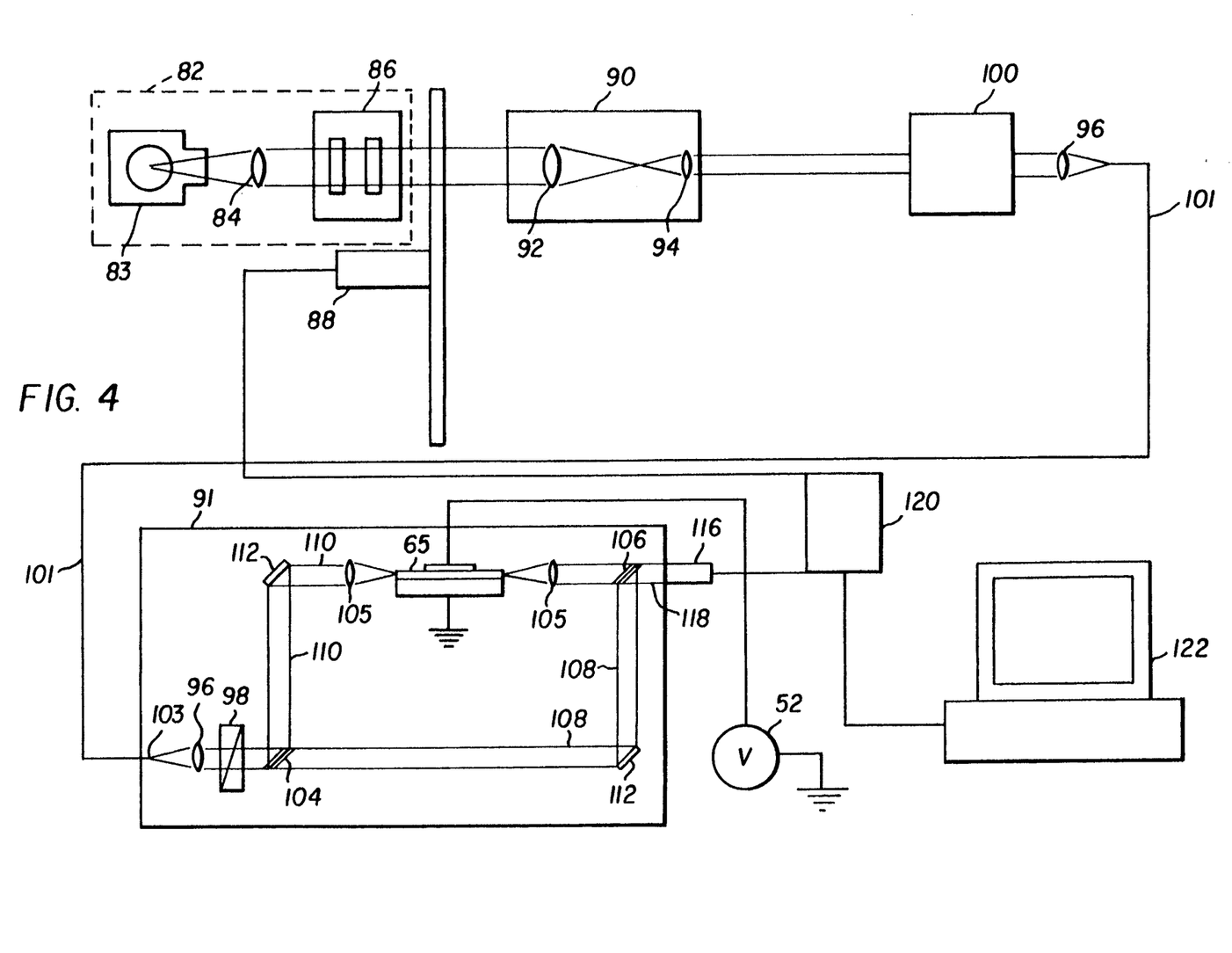
FIG. 4 is a schematic diagram of yet another embodiment of the liquid crystal optical device of the invention.

Referring now to FIG. 4, another embodiment of the LC optical device 10 of the invention is a spectrometer, which incorporates either of the embodiments of LC optical device of FIGS. 1 and 2. The portion incorporating the embodiment of FIG. 1 or 2 is designated "65" in FIG. 4. Discrete components are illustrated in FIG. 4, however, it should be understood that integrated components could be substituted. For example, the LC optical device 10 of FIG. 3 could be substituted for multiple-component interferometer 91. Light pathways can be through air or through waveguides or the like. Coupling of light into and out of the waveguides can be provided by cylinder lenses, as below described or by equivalent means, for example using a cylinder lens and a grating or using butt coupling of appropriately configured optical fibers to the edge faces of planar waveguides.

Light source 82 provides a collimated beam. In FIG. 4, light source encloses symbols for a lamp 83, a collimator lens 84, and a filter 86. A xenon lamp or other suitable broadband light source could be used and would have a bandwidth of at least 200 nanometers. Beam can pass through filter 86 before or after passing through collimator 84. Filter 86 limits filtered beam to a spectrum in the 1 to 2 micrometer range to reduce unnecessary heating and background radiation. Filter 86, for example, can consist of an infrared cut-off filter made of borosilicate glass, marketed as a Type 7740 Pyrex filter by Corning Glass Works of Corning, New York, which cuts out light with wavelengths greater than 2.7 micrometers, and a visible cut-off filter marketed as a Melles Griot RG 850 filter by Melles Griot of Irvine, Calif., which cuts off light with wavelengths less than 0.85 micrometers.

Figure 5:
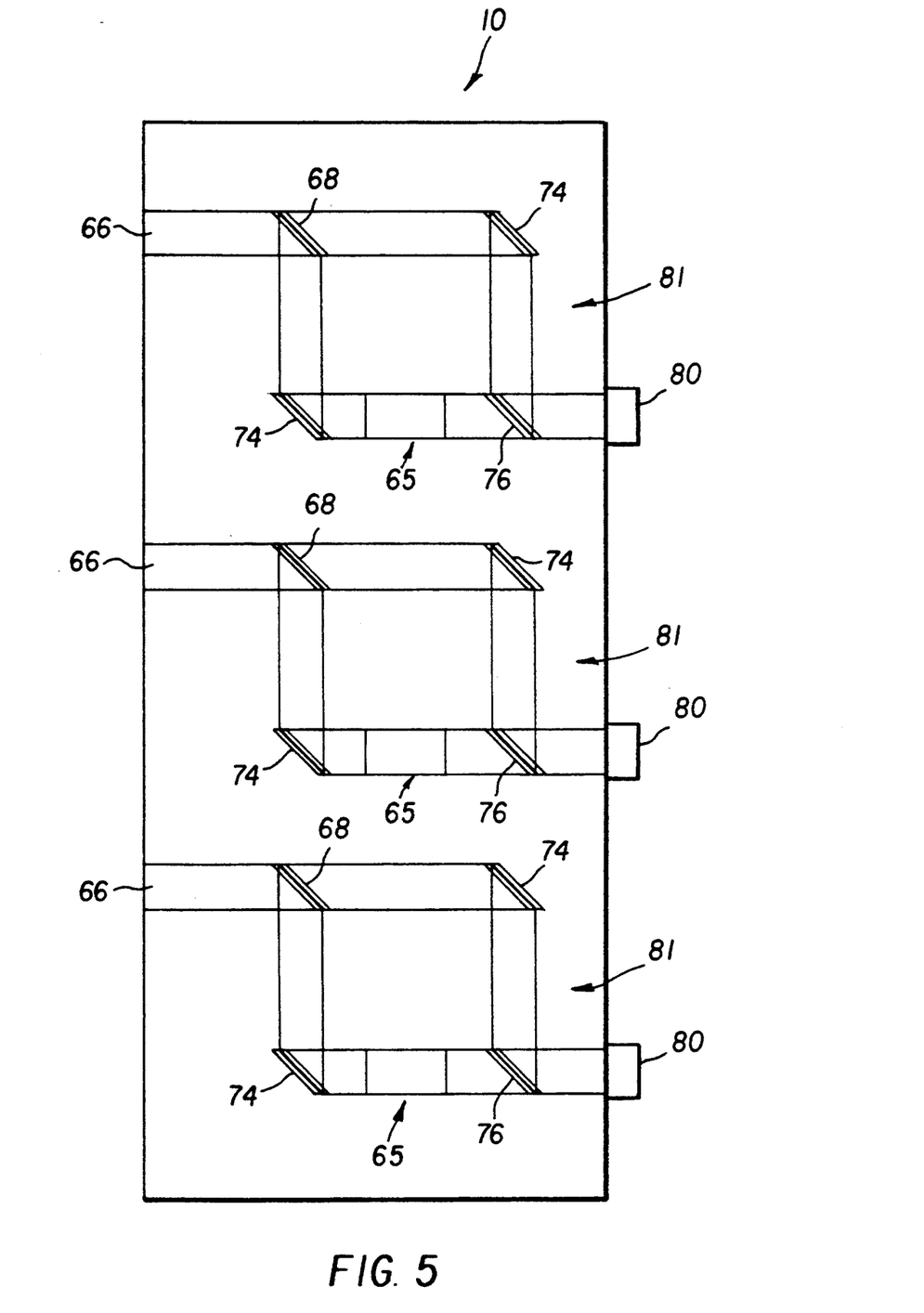
FIG. 5 is a schematic diagram of still another embodiment of the liquid crystal optical device of the invention.
Figure 7:
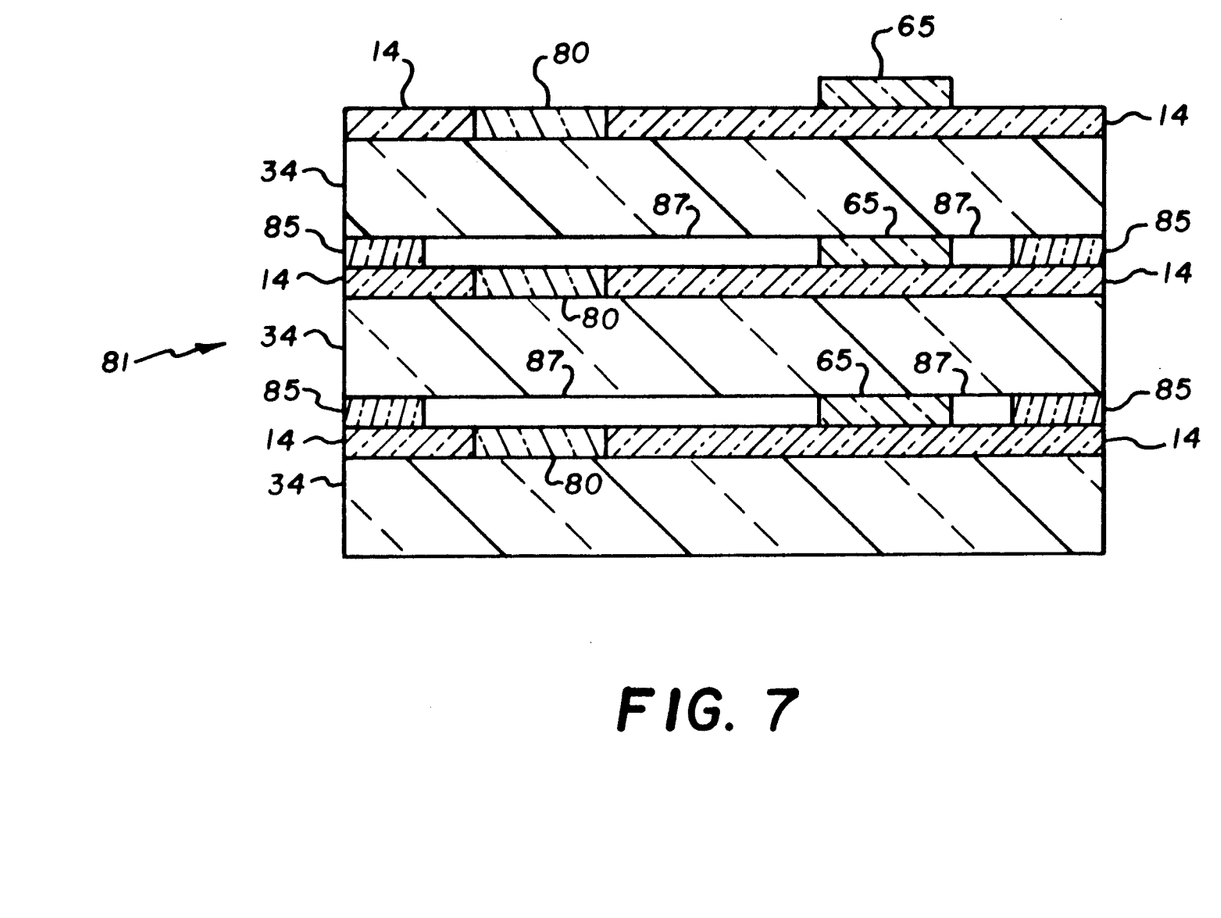
FIG. 7 is a schematic diagram of another embodiment of the liquid crystal optical device of the invention.

Light source 82 is, more desirably, one or more light emitting diodes, each having a bandwidth of about 50 nanometers. As a matter of convenience, rather than providing multiple light sources to a single interferometer, spectrometer could include a series of the interferometers or LC optical devices 10 of the embodiment of FIG. 3, each associated with an individual LED. For convenience those interferometers could be components of a single chip, as shown in FIG. 5 or could be components of individual chips arranged in a stack and separated by spacer elements 85 and air gaps 87, as shown in FIG. 7. Chips could be adhered to spacer elements 85 or held in place by other equivalent means. Those portions of the LC optical devices 10 of FIGS. 5 and 7, which correspond to the LC optical device of FIG. 3, are designated "81" in FIGS. 5 and 7.

Referring again to FIG. 4, beam next passes through a chopper 88, a device which mechanically blocks beam on an intermittent basis and a beam compressor 90. A convenient beam compressor 90 has a ratio of 10 to 1 and has front and rear lenses 92,94 with focal lengths of 100 millimeters and 10 millimeters, respectively. A sample chamber 100 is disposed in the path of beam, in the position shown in FIG. 4, or in any of a variety of other positions, subject to practical limitations well known to those skilled in the art, such as the size of sample chamber 100 relative to beam and the effect of heating. For example, fiber optics can be used to relay the beam. The sample chamber can also be placed on or adjacent the waveguide, in an embodiment of the invention such as that shown in FIG. 3, such that the evanescent portion of the guided beam extends into the sample chamber. In this case, the sample chamber must be located either before the beamsplitter 68 or after the beam combiner 76 (not shown). Within sample chamber 100, beam is reflected off or transmitted through a sample (not shown) that is in gaseous, liquid or solid state or a mixture of two states, such as particulates suspended in a gas or liquid.

After exiting sample chamber 100, beam is coupled into an optical fiber 101 by means of a spherical lens 96. Optical fiber 101 may be single or multi-mode over the optical bandwidth of LC device 10. Beam passes from fiber 101 into entrance 103 of multiple-component Mach-Zehnder interferometer 91. Beam passes through spherical lens 96 and is collimated. The collimated beam then passes through a polarizer 98, which is oriented such that beam polarization exiting polarizer 98 is parallel to plane 62. Beam is then divided by a beam splitter 104. Beam splitter 104 and a beam combiner 106 are half-silvered mirrors or the like and divide and recombine the beam, respectively. The divided portions of the beam are propagated along reference and delay arms 108,110. Each arm has a mirror 112 as a reflector. Delay arm 110 includes LC optical device 65 and transformer-couplers 105 for propagation of the beam portion into and out of optical device 65. Transformer-coupler alters the cross-section of the beam in order to couple the beam into the waveguide 12 of LC device 65 and can be comprised of a spherical lens combined with a cylindrical lens. Detector 116, which is a photodiode or the like, is positioned to receive beam from exit 118. The signal from detector 116 is sent to a lock-in amplifier 120, which, to reduce noise, is electronically tuned to only register light modulated at a frequency corresponding to the modulation frequency of chopper 88. A signal provided by lock-in amplifier 120 can be processed to provide the Fourier transform of the spectrum of the propagated light and displayed by means well known to those skilled in the art. Processing and display functions are symbolized in FIG. 4 as a personal computer 122. The following example further illustrates this invention.

Figure 6:
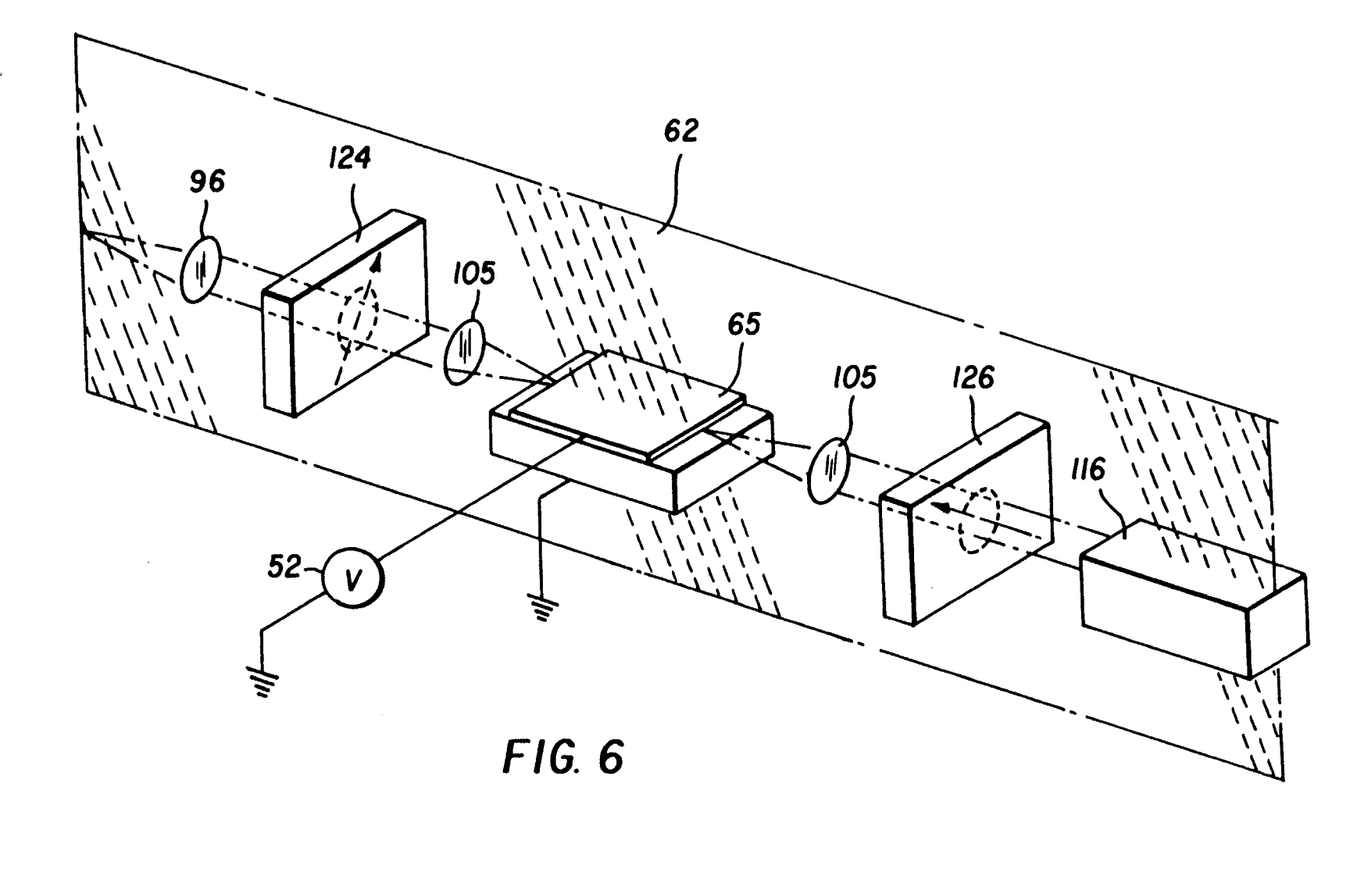
FIG. 6 is a schematic diagram of yet another embodiment of the liquid crystal optical device of the invention.

FIG. 6 shows another embodiment of LC optical device 10. This embodiment of device 10 could be used, for example, as an interferometer in place of the multiple-component Mach-Zehnder interferometer 91 in the spectrometer of FIG. 4. Referring now to FIG. 6, this embodiment of LC optical device 10 has a portion, designated "65", which incorporates either of the embodiments of LC optical device of FIGS. 1 and 2. Discrete components are illustrated in FIG. 6, however, it should be understood that integrated components could be substituted. Light pathways can be through air or through waveguides or the like.

The LC optical device or interferometer of FIG. 6 includes device 65 and transformer-couplers 105 for coupling of the propagated beam into and out of optical device 65. Before and after transformer-couplers 105 are first and second linear polarizers 124,126. Each polarizer 124,126 has its polarization direction oriented at an oblique angle, preferably 45 degrees, to plane 62. First and second polarizers 124,126 are "crossed". The term "crossed" is used broadly herein to refer to the relative orientations of a pair of polarizers, which are arranged as a polarizer-analyzer pair having non-parallel polarization directions, and is not limited to only an orthogonal orientation. It is preferred, however, that the polarization directions of first and second polarizers 124,126 be perpendicular and that each polarization direction be at an angle of 45 degrees to plane 62.

In use, a collimated beam is provided to the LC device 10 of FIG. 6 by a single mode optical fiber 101 and collimator 96 or the like. The beam then passes through first polarizer 124, which divides beam into transverse electric and transverse magnetic modes. Both modes pass through device 65. A voltage is selectively applied across the electrodes of device 65 causing a retardation of the transverse magnetic mode in the same manner as discussed above in relation to the other embodiments of the invention. The transverse electric mode is not retarded. Both modes are combined by the second polarizer 126 to provide an interference signal. This embodiment of LC device 10 is very compact and less subject to temperature caused variation and the like, since reference and delay arms of the interferometer are physically superimposed.

EXAMPLE

An evanescent field type LC optical device, corresponding to the embodiment shown in FIG. 2, was prepared using a heavily p-doped silicon wafer, as a lower electrode. An $SiO_2$ base buffer layer 0.65 micrometers thick was thermally grown onto the silicon chip. The index of base buffer layer was determined to be 1.47 at 0.633 micrometers A $SiO_xN_y$:H guide member was deposited over base buffer layer by plasma enhanced, low pressure CVD using a reactor produced by Advanced Semiconductor Materials of Phoenix, Ariz. Guide member was applied at about 380 degrees C with an applied rf field at 450 Hz in a gas mixture of $SiH_4$, $NH_3$ and $N_2O$. The thickness of guide member was 0.94 micrometers. The index of guide member was 1.79 at 0.633 micrometers. An exact composition was not determined for guide member, however, an approximate composition can be estimated based upon Speakman, S.P., et. al., *Vacuum*, 38(2), pages 183–188, (1988); according to which the index of about 1.8 is indicative of a material having the approximate formula: $Si_{O0.75}N_{0.91}$:$H_{0.47}$. An $SiO_x$ base alignment layer was prepared by thermally evaporating SiO under vacuum onto the guide member. The surface normal of the silicon chip was oriented at an angle of 85 degrees from the direction of evaporant flux. Evaporation was continued for a time period calibrated to provide a nominal thickness of 50 angstroms.

A 12.5 micrometer thick mylar spacer was placed upon the base alignment layer. The spacer defined a slot 4 millimeters wide and 12 millimeters long. A cover, made of glass and having a width and length greater than spacer was selected. An indium tin oxide cover electrode layer having a thickness of less than 0.1 micrometers was vacuum deposited onto cover. A cover alignment layer was then thermally evaporated onto cover electrode. Cover was then positioned on spacer defining a chamber bordered by alignment layers and spacer. Chamber was filled with liquid crystal material marketed as ZLI-1289 by E. Merck of Darmstadt, Germany and having an $n_e$ of 1.6917 and an $n_o$ of 1.5137 for light at a wavelength of 0.6328 nanometers.

A pair of beamsplitters and a detector were arranged in the light beam provided by a HeNe laser having a continuous output at a wavelength of 0.6328 micrometers, to provide a Mach-Zehnder interferometer having a free space propagating reference arm and another arm with light propagated through guide member of LC optical device. Light was coupled into and out of guide member by prisms. The LC optical device supported at least two TE and TM modes at a wavelength of 0.6328 micrometers. A voltage was applied to electrodes and gradually increased. The Table shows experimentally measured retardation, that is, optical path difference divided by the wavelength of the propagated light, for the TM1 mode at a wavelength of 0.6328 micrometers for the peak of each applied voltage ramp.

TABLE

| VOLTAGE | RETARDATION (in number of waves) |
|---------|----------------------------------|
| 2       | 1                                |
| 2.5     | 1.5                              |
| 4       | 4                                |
| 5       | 6                                |
| 6       | 8                                |
| 8       | 13                               |
| 10      | 19                               |
| 12      | 24                               |
| 14      | 30                               |
| 16      | 36                               |
| 18      | 42                               |
| 20      | 47                               |
| 25      | 61                               |
| 30      | 73                               |
| 35      | 83                               |
| 40      | 92                               |
| 50      | 100                              |

The waveguide liquid crystal optical device of the invention provides the advantage that propagated light is guided along the longitudinal axis of an elongate mass of liquid crystal and a voltage imposed on the liquid crystal varies the optical pathlength.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A waveguide optical device comprising a substantially planer guide member for propagation of light in a longitudinal direction, said guide member having upper and lower boundaries, a chamber positioned adjacent to a surface of said guide member, a mass of birefringent material disposed in said chamber said birefringent material having molecular dipoles subject to alignment by an imposed electrical field, said birefringent mass for generating a delay or optical path difference and being overlapped by the optical field of said propagated light, an upper electrode disposed in spaced relation to said birefringent mass, a lower electrode disposed in spaced relation to said guide member, said electrodes having the capability of imposing an alternating current voltage across said birefringent mass to rotate the molecular dipoles of said birefringent mass in a plane defined by the normal to said substantially planar guide member and the propagation vector of said light, said boundaries and said electrodes defining an upper isolation zone between said upper electrode and said upper boundary, a guide path between said boundaries, and a lower isolation zone between said lower boundary and said lower electrode, said guide path having an effective index of refraction greater than the effective indexes of refraction of said isolation zones.

2. A liquid crystal optical device comprising a substantially planer guide member for propagation of light in a longitudinal direction, said guide member having upper and lower boundaries, a chamber positioned adjacent to a surface of said guide member a mass of liquid crystal material disposed within said chamber, said liquid crystal mass for generating a delay or optical path difference and being overlapped by the optical field of said propagated light, first and second alignment layers impelling the director of said liquid crystal mass to lie in a plane containing the normal to said guide member and the propagation vector of said light, an upper electrode disposed in spaced relation to said liquid crystal mass, a lower electrode disposed in spaced relation to said guide member, said electrodes having the capability of imposing an alternating current voltage across said liquid crystal mass to rotate said director in said plane, said boundaries and said electrodes defining an upper isolation zone between said upper electrode and said upper boundary, a guide path between said boundaries, and a lower isolation zone between said lower boundary and said lower electrode, said guide path having an effective index of refraction greater than the effective indexes of refraction of said isolation zones.

3. The liquid crystal optical device of claim 2 wherein said first alignment layer overlies and is adjacent to said upper boundary and said second alignment layer is disposed in spaced relation to said upper boundary.

4. The liquid crystal optical device of claim 2 further comprising a pair of optical buffer layers disposed between respective said electrodes and said liquid crystal mass.

5. The liquid crystal optical device of claim 2 wherein said alignment layers, said isolation zones and said electrodes are each substantially planar.

6. The liquid crystal optical device of claim 2 wherein said alignment layers impel the director of said liquid crystal mass to align substantially parallel to said alignment layers and substantially parallel to said plane containing the normal to said guide member and the propagation vector of said light.

7. The liquid crystal optical device of claim 2 wherein said alignment layers impel the director of said liquid crystal mass to align substantially perpendicular to said alignment layers and substantially parallel to said plane containing the normal to said guide member and the propagation vector of said light.

8. The liquid crystal optical device of claim 2 further comprising a cover disposed adjacent said guide member in substantially parallel relation to said guide member, said guide member and said cover together defining said chamber extending longitudinal to said guide member, said cover supporting one of said alignment layers.

9. The liquid crystal optical device of claim 2 wherein said guide member is continuous.

10. The liquid crystal optical device of claim 2 wherein said liquid crystal material is nematic.

11. The liquid crystal optical device of claim 2 further comprising first and second polarizers disposed in said propagated beam before and after said liquid crystal mass, respectively, said polarizers being crossed, said polarizers linearly polarizing said propagated beam at oblique angles to said plane.

12. The liquid crystal optical device of claim 11 wherein each said polarizer linearly polarizes said beam at an angle of about 45 degrees to said plane and said second polarizer linearly polarizes said beam at an angle of about 90 degrees to the direction of polarization of said first polarizer.

13. The liquid crystal optical device of claim 2 further comprising an interferometer assembly incorporating said guide member to provide a path length difference, whereby said liquid crystal optical device functions as an interferometer.

14. The liquid crystal optical device of claim 13 wherein said interferometer assembly further comprises a beam splitter dividing said beam into a reference portion and a delay portion, said delay portion being propagated along said guide path for selective retardation of said delay portion relative to said reference portion, and a beam combiner recombining said beam portions.

15. The liquid crystal optical device of claim 2 further comprising a spectrometer assembly incorporating said guide member to provide a path length difference, whereby said liquid crystal optical device functions as a spectrometer.

16. The liquid crystal optical device of claim 15 wherein said spectrometer assembly further comprises a light source, said light source providing a collimated beam, a sample chamber disposed in at least a portion of said beam, an interferometer assembly including a polarizer disposed to receive said beam, said polarizer inducing a beam polarization parallel to said plane, means for dividing said beam into a reference portion and a delay portion, said delay portion being propagated along said guide path for selective retardation of said delay portion relative to said reference portion, and means for recombining said beam portions.

17. The liquid crystal optical device of claim 2 further comprising at least one additional liquid crystal optical device of claim 2.

18. The liquid crystal optical device of claim 17 further comprising a substrate supporting and integral with said liquid crystal optical devices.

19. A liquid crystal optical device comprising a substantially planar guide member for propagation of light in a longitudinal direction, a cover disposed in substantially parallel relation to said guide member, a pair of alignment layers disposed on said guide member and said cover, respectively, said alignment layers defining an interposed chamber, said chamber being overlapped by the optical field of light propagated in said guide member, a mass of nematic liquid crystal material disposed within said chamber for generating a delay or optical path difference, said liquid crystal mass having a director oriented by said alignment layers in the absence of an electrical field, said oriented director lying in a plane containing the normal to said guide member and a vector defined by the direction of light propagation in said guide member, a pair of electrodes juxtaposed in spaced relation to said chamber, said electrodes being connectable to an electrical source for imposition of a field across said chamber and rotation of said director in said plane.

20. The liquid crystal optical device of claim 19 further comprising a pair of optical buffer layers disposed between respective said electrodes and said liquid crystal mass.

21. The liquid crystal optical device of claim 20 wherein said liquid crystal mass is exterior to said guide member and said guide member has a greater effective index of refraction than said optical buffer and the ordinary and extraordinary indexes of refraction of said liquid crystal mass.

22. The liquid crystal optical device of claim 21 wherein said chamber is disposed within said guide member and the effective index of refraction along said propagation vector is greater than the index of refraction of said optical buffer.

23. A waveguide optical device comprising a guide member for propagation of light in a longitudinal direction, said guide member having upper and lower boundaries, a mass of birefringent material adjoining said upper boundary, said birefringent mass for generating a delay or optical path difference and being overlapped by the evanescent optical field of said propagated light, said birefringent material having molecular dipoles subject to alignment by an imposed electrical field, an upper electrode disposed in spaced relation to said birefringent mass, a lower electrode disposed in spaced relation to said guide member, said electrodes having the capability of imposing an alternating current voltage across said birefringent mass to rotate the molecular dipoles of said birefringent mass in a plane defined by the normal to said guide member and the propagation vector of said light, said boundaries and said electrodes defining an upper isolation zone between said upper electrode and said upper boundary, a guide path between said boundaries, and a lower isolation zone between said lower boundary and said lower electrode, said guide path having an effective index of refraction greater than the effective indexes of refraction of said isolation zones.

24. A liquid crystal optical device comprising a guide member for propagation of light in a longitudinal direction, said guide member having upper and lower boundaries, a mass of liquid crystal material disposed within said guide member, said liquid crystal mass for generating a delay or optical path difference and being overlapped by the non-evanescent optical field of said propagated light, first and second alignment layers impelling the director of said liquid crystal mass to lie in a plane containing the normal to said guide member and the propagation vector of said light, an upper electrode disposed in spaced relation to said liquid crystal mass, a lower electrode disposed in spaced relation to said guide member, said electrodes having the capability of imposing an alternating current voltage across said liquid crystal mass to rotate said director in said plane, said boundaries and said electrodes defining an upper isolation zone between said upper electrode and said upper boundary, a guide path between said boundaries, and a lower isolation zone between said lower boundary and said lower electrode, said guide path having an effective index of refraction greater than the effective indexes of refraction of said isolation zones.

* * * * *